(12) United States Patent
Wuidart

(10) Patent No.: US 8,798,533 B2
(45) Date of Patent: *Aug. 5, 2014

(54) EVALUATION OF THE COUPLING FACTOR OF AN ELECTROMAGNETIC TRANSPONDER BY CAPACITIVE DETUNING

(75) Inventor: Luc Wuidart, Pourrieres (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 224 days.

This patent is subject to a terminal disclaimer.

(21) Appl. No.: 13/151,622

(22) Filed: Jun. 2, 2011

(65) Prior Publication Data

US 2011/0300800 A1 Dec. 8, 2011

(30) Foreign Application Priority Data

Jun. 3, 2010 (FR) .................................. 10 54355

(51) Int. Cl.
*H04B 5/00* (2006.01)

(52) U.S. Cl.
USPC ................... 455/41.1; 340/572.4; 340/572.5

(58) Field of Classification Search
USPC .......... 340/10.4, 572.4, 572.1–572.5; 342/42, 342/118, 127; 455/41.1
See application file for complete search history.

(56) References Cited

U.S. PATENT DOCUMENTS

| | | | |
|---|---|---|---|
| 6,473,028 B1 * | 10/2002 | Luc | 342/118 |
| 7,049,935 B1 | 5/2006 | Wuidart et al. | |
| 7,049,936 B2 * | 5/2006 | Wuidart | 340/10.4 |
| 2004/0104809 A1 | 6/2004 | Rizzo et al. | |
| 2008/0204206 A1 * | 8/2008 | Frohler | 340/426.1 |

OTHER PUBLICATIONS

French Search Report dated Jan. 18, 2011 from corresponding French Application No. 10/54355.

* cited by examiner

*Primary Examiner* — Gennadiy Tsvey
(74) *Attorney, Agent, or Firm* — Wolf, Greenfield & Sacks, P.C.

(57) ABSTRACT

A method for evaluating the current coupling factor between an electromagnetic transponder and a terminal, and a transponder implementing this method, wherein a ratio between data representative of a voltage across an oscillating circuit of the transponder and obtained for two capacitance values of the oscillating circuit is compared with one or several thresholds.

37 Claims, 5 Drawing Sheets

EVALUATION OF THE COUPLING FACTOR OF AN ELECTROMAGNETIC TRANSPONDER BY CAPACITIVE DETUNING

CROSS REFERENCE TO RELATED APPLICATIONS

This application claims the priority benefit of French patent application Ser. No. 10/54355, filed on Jun. 3, 2010, entitled "EVALUATION OF THE COUPLING FACTOR OF AN ELECTROMAGNETIC TRANSPONDER BY CAPACITIVE DETUNING," which is hereby incorporated by reference to the maximum extent allowable by law.

BACKGROUND OF THE INVENTION

1. Field of the Invention

The present invention generally relates to electronic systems, and more specifically to systems using electromagnetic transponders, that is, transceivers capable of being interrogated in a contactless and wireless manner by a read and/or write terminal.

2. Discussion of the Related Art

Many communication systems are based on a modulation of an electromagnetic field generated by a terminal. They range from a simple electronic tag used as a theft-prevention device to more complex systems where a transponder capable of communicating with the terminal when present in the field thereof is equipped with calculation functions (electronic purse, for example) or data processing functions.

Electromagnetic transponder systems are based on the use of oscillating circuits comprising a winding forming an antenna, on the transponder side and on the terminal side. Such circuits are adapted to be coupled by near magnetic field when the transponder enters the field of the terminal. The oscillating circuits of the terminal and of the transponder are generally tuned to the same frequency corresponding to the excitation frequency of the oscillating circuit of the terminal.

In most cases, transponders have no autonomous power supply and extract the power supply necessary to their circuits from the high-frequency field radiated by the antenna of the terminal.

The quality of the communication and of the possible power transfer depends on the coupling between the terminal and the transponder. This coupling, which is inversely proportional (non linear) to the distance between the terminal and the transponder, conditions the amplitude of the voltage recovered by the transponder. It is thus desirable to be able to evaluate the current coupling factor between a transponder and a terminal having it in its field.

SUMMARY OF THE INVENTION

It would be desirable to be able to evaluate the coupling factor between a transponder and a terminal.

It would also be desirable to be able to evaluate the variation of this coupling factor during a communication.

It would also be desirable to be able to evaluate the coupling factor without it being necessary to perform a data exchange between the terminal and the transponder.

It would also be desirable to be able to perform this evaluation on the transponder side.

It would also be desirable to provide a solution independent from the type of terminal having the transponder in its field.

To achieve all or part of these and other objects, an embodiment provides a method for evaluating the current coupling factor between an electromagnetic transponder and a terminal, wherein a ratio between data representative of a voltage across an oscillating circuit of the transponder and obtained for two capacitance values of the oscillating circuits, is compared with one or several thresholds.

According to an embodiment,
first data, relative to the level of a D.C. voltage provided by a rectifier across the oscillating circuit, are measured and stored for a first value of the capacitance; and
second data, relative to the level of said D.C. voltage, are measured and stored for a second value of the capacitance.

According to an embodiment, the evaluation provides a position of the current coupling factor with respect to a position of optimum coupling with one of the two values of the capacitance.

According to an embodiment, said thresholds are a function of said values.

According to an embodiment, a variation of the capacitance between the first and second values is obtained by switching a capacitive element comprised by the transponder.

An embodiment also provides an electromagnetic transponder comprising:
an oscillating circuit upstream of a rectifying circuit capable of providing a D.C. voltage when the transponder is in the magnetic field of a terminal; and
at least one processing unit programmed to implement the coupling factor evaluation method.

According to an embodiment, the transponder further comprises at least one switchable capacitive element capable of being functionally connected in parallel to the oscillating circuit.

The foregoing and other objects, features, and advantages will be discussed in detail in the following non-limiting description of specific embodiments in connection with the accompanying drawings.

DETAILED DESCRIPTION

Figure 1:
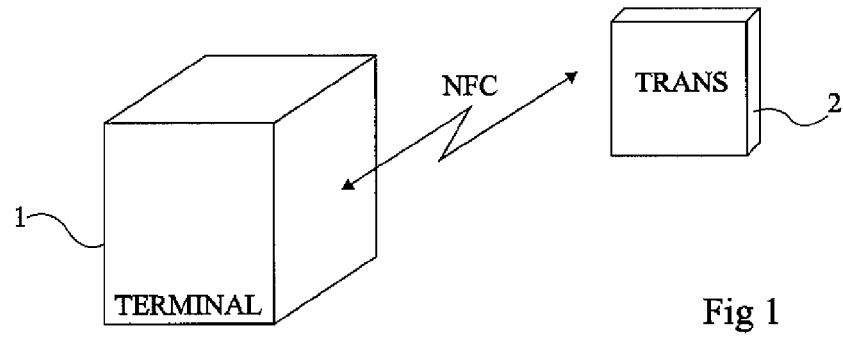
FIG. 1 is a very simplified representation of a transponder system of the type to which the present invention applies as an example.

The same elements have been designated with the same reference numerals in the different drawings. For clarity, only those steps and elements which are useful to the understanding of the present invention have been shown and will be described. In particular, the communications between the transponder and the terminal have not been detailed, the present invention being compatible with any usual communication. Further, the functions likely to be implemented by a terminal or by a transponder, other than the determination of the coupling factor by this transponder, have not been detailed either, the present invention being here again compatible with any usual function of a terminal or of a transponder.

FIG. 1 is a block diagram of an electromagnetic transponder communication system. A terminal 1 (TERMINAL) is capable of communicating in near field (for example according to a near field communication protocol NFC) with a distant element, that is, a transponder 2 (TRANS).

The terminal may take different forms, for example, that of a transport ticket validation terminal, an electronic passport reader, a laptop computer, a mobile communication device (GSM phone, PDA, etc.), an electronic control unit for starting an automobile vehicle, etc.

The transponder may similarly take different forms, for example, that of a chip card, an electronic transport ticket, an electronic passport, a telecommunication terminal (GSM phone, PDA, etc.), an electronic tag, etc.

Figure 2:
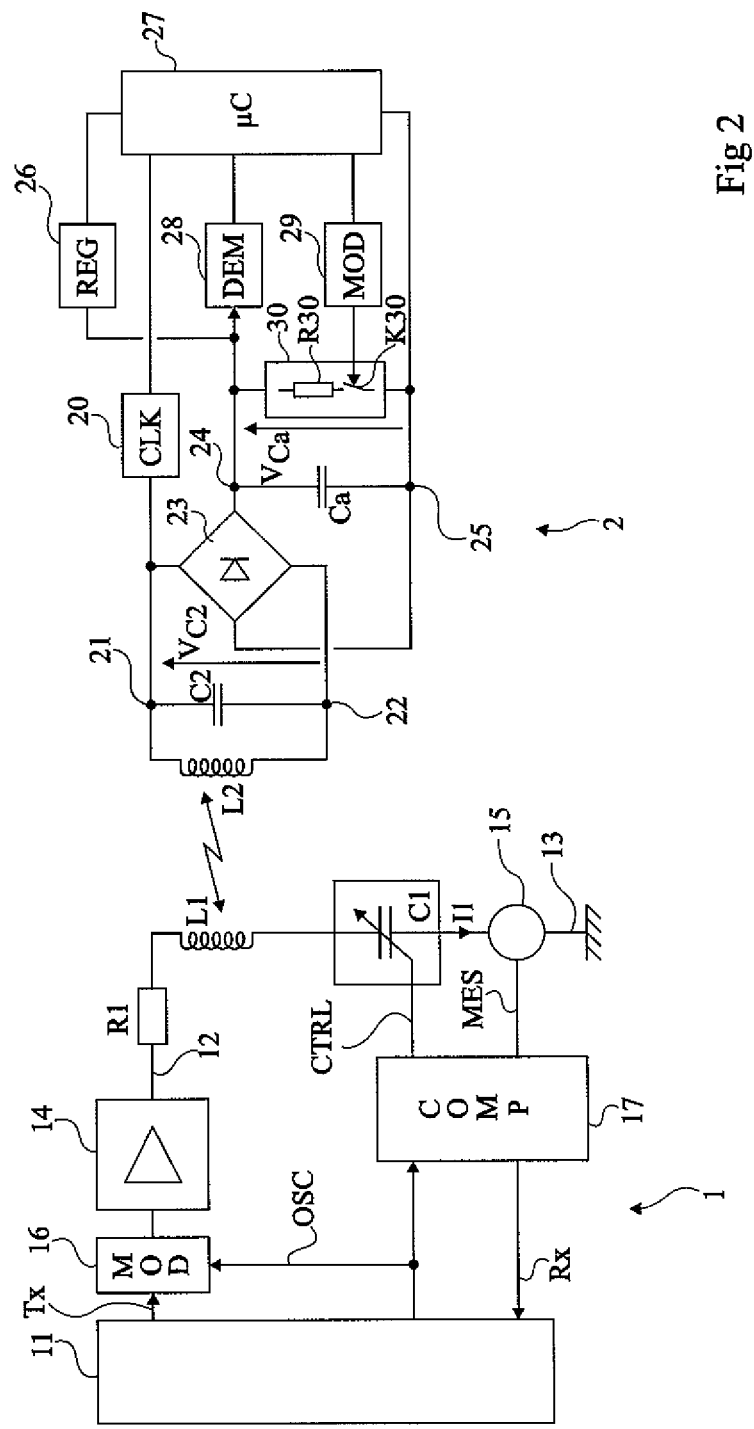
FIG. 2 is a simplified block diagram of a terminal and of a transponder of an electromagnetic transponder communication system.

FIG. 2 very schematically shows a simplified example of a terminal 1 and of a transponder 2.

Terminal 1 comprises an oscillating circuit, generally in series, formed of an inductance L1 in series with a capacitor C1 and a resistor R1. This series oscillating circuit is, in the example of FIG. 2, connected between an output terminal 12 of an amplifier or antenna coupler 14 and a terminal 13 at a reference voltage (generally the ground). An element 15 for measuring the current in the oscillating circuit is interposed, for example, between capacitive element C1 and ground 13. Measurement element 15 belongs to a phase regulation loop which will be described hereafter. Amplifier 14 receives a high-frequency transmission signal originating from a modulator 16 (MOD) which receives a reference frequency (signal OSC), for example, from a quartz oscillator (not shown). Modulator 16 receives, if need be, a signal Tx originating from a circuit 11 for controlling and exploiting the transmissions. Circuit 11 is generally provided with a control and data processing microprocessor, communicating with different input/output circuits (keyboard, display, element of exchange with a server, etc.) and/or processing circuits, which have not been detailed. The elements of terminal 1 most often draw the power necessary to their operation from a supply circuit (not shown) connected, for example, to the power line distribution system (mains) or to a battery (for example, that of an automobile vehicle or of a portable telephone or computer). Modulator 16 provides a high-frequency carrier (for example, at 13.56 MHz) to series oscillating circuit L1-C1, which generates a magnetic field.

Capacitive element C1 is, for example, a variable-capacitance element controllable by a signal CTRL. This element takes part in the phase regulation of current I1 in antenna L1 with respect to a reference signal. This regulation is a regulation of the high-frequency signal, that is, of the signal of the carrier corresponding to the signal provided to amplifier 14 in the absence of data Tx to be transmitted. The regulation is performed by varying capacitance C1 of the oscillating circuit of the terminal to maintain the current in the antenna in constant phase relationship with a reference signal. This reference signal for example corresponds to signal OSC provided to modulator 14. Signal CTRL originates from a circuit 17 (COMP) having the function of detecting the phase interval with respect to the reference signal and of accordingly modifying the capacitance of element C1. The comparator receives data MES relative to current I1 in the oscillating circuit detected by measurement element 15 (for example, an intensity transformer or a resistor).

A transponder 2, capable of cooperating with terminal 1, comprises an oscillating circuit, for example, parallel, formed of an inductance L2 in parallel with a capacitor C2 between two terminals 21 and 22. The parallel oscillating circuit (called receive resonant circuit) is capable of capturing the magnetic field generated by oscillating circuit L1-C1 of terminal 1. Circuits L2-C2 and L1-C1 are tuned to a same resonance frequency (for example, 13.56 MHz). Terminals 21 and 22 are connected to two A.C. input terminals of a rectifying bridge 23 (most often, fullwave). The rectified output terminals of bridge 23 respectively define a positive terminal 24 and a reference terminal 25. A capacitor Ca is connected between terminals 24 and 25 to smooth the rectified voltage. The recovered power is used to recharge a battery, not shown.

When transponder 2 is in the field of terminal 1, a high-frequency voltage is generated across resonant circuit L2-C2. This voltage, rectified by bridge 23 and smoothed by capacitor Ca, provides a supply voltage to electronic circuits of the transponder via a voltage regulator 26 (REG). Such circuits generally comprise a processing unit 27 (for example, a microcontroller μC) associated with a memory (not shown), a demodulator 28 (DEM) of the signals that may have been received from terminal 1, and a modulator 29 (MOD) for transmitting data to the terminal. The transponder is generally synchronized by means of a clock (CLK) extracted, by a block 20, from the high-frequency signal recovered, before rectification, from one of terminals 21 and 22. Most often, all the electronic circuits of transponder 2 are integrated in a same chip.

To transmit data from terminal 1 to the transponder, circuit 16 modulates (generally in amplitude) the carrier (signal OSC) according to signal Tx. On the side of transponder 2, these data are demodulated by demodulator 28 based on voltage $V_{Ca}$. The demodulator may sample the signal to be demodulated upstream of the rectifying bridge.

To transmit data from transponder 2 to terminal 1, modulator 29 controls a stage 30 of modulation (retromodulation) of the load formed by the transponder circuits on the magnetic field generated by the terminal. This stage is generally formed of an electronic switch K30 (for example, a transistor) and of a resistor R30 (or a capacitor), in series between terminals 24 and 25. Switch K30 is controlled at a so-called sub-carrier frequency (for example, 847.5 kHz), much lower (generally by a ratio of at least 10) than the frequency of the excitation signal of the oscillating circuit of terminal 1. When switch K30 is on, the oscillating circuit of the transponder is submitted to an additional damping with respect to the load formed by circuits 20, 26, 27, 28, and 29 so that the transponder samples a greater amount of power from the high-frequency magnetic field. On the side of terminal 1, amplifier 14 maintains the amplitude of the high-frequency excitation signal constant. Accordingly, the power variation of the transponder translates as an amplitude and phase variation of the current in antenna L1. This variation is detected by an amplitude or phase demodulator of the terminal. In the embodiment illustrated in FIG. 2, comparator 17 integrates a phase demodulator also used to demodulate the signal originating from the transponder. Accordingly, comparator 17 provides a signal Rx returning to circuit 11 a possible retromodulation of data received from a transponder. Other demodulation circuits may be provided, for example, a circuit exploiting a measurement of the voltage across capacitor C1.

Many variations exist to encode/decode and modulate/demodulate communications between a transponder and a terminal.

The response time of the phase regulation loop is sufficiently long to avoid disturbing the possible retromodulation from a transponder and sufficiently short as compared with the speed at which a transponder passes in the field of the terminal. It can be spoken of a static regulation with respect to the modulation frequencies (for example, the 13.56-MHz frequency of the remote supply carrier and the 847.5-kHz retromodulation frequency used to transmit data from the transponder to the terminal).

An example of a phase regulation terminal is described in document EP-A-0857981.

The fact that the phase is regulated on the terminal side enables to exploit current and voltage measurements in the oscillating circuit of the transponder, to deduce therefrom information relative to the transponder coupling when it is in the field of the terminal. The coupling coefficient between the oscillating circuits of the terminal and of the transponder essentially depends on the distance separating the transponder from the terminal. The coupling coefficient, noted k, always is between 0 and 1. It can be defined by the following formula:

$$k = \frac{M}{\sqrt{L1 \cdot L2}}, \quad \text{(Formula 1)}$$

where M represents the mutual inductance between inductances L1 and L2 of the oscillating circuits of the terminal and of the transponder.

An optimum coupling is defined as being the position at which voltage $V_{C2}$ across the oscillating circuit of the transponder is at its maximum. This optimum coupling, noted $k_{opt}$, may be expressed as:

$$k_{opt} = \sqrt{\frac{L2}{L1} \cdot \frac{R1}{R2}}, \quad \text{(Formula 2)}$$

where R2 represents the resistance equivalent to the load formed by the elements of the transponder on its own oscillating circuit. In other words, resistor R2 represents the equivalent resistance of all the circuits (microprocessor, retromodulation means, etc.) of transponder 2, placed in parallel on capacitor C2 and inductance L2 (before or after the rectifying bridge). The conductance due to the transponder circuits, and thus their power consumption, will be called "resistive load". The level of this load is symbolized by resistor R2 in parallel across the oscillating circuit. In above formula 2, the series resistance of inductance L1 (terminal antenna) has been neglected. It can also be considered that the value of this series resistance is, for simplification, included in the value of resistor R1.

Figure 3:
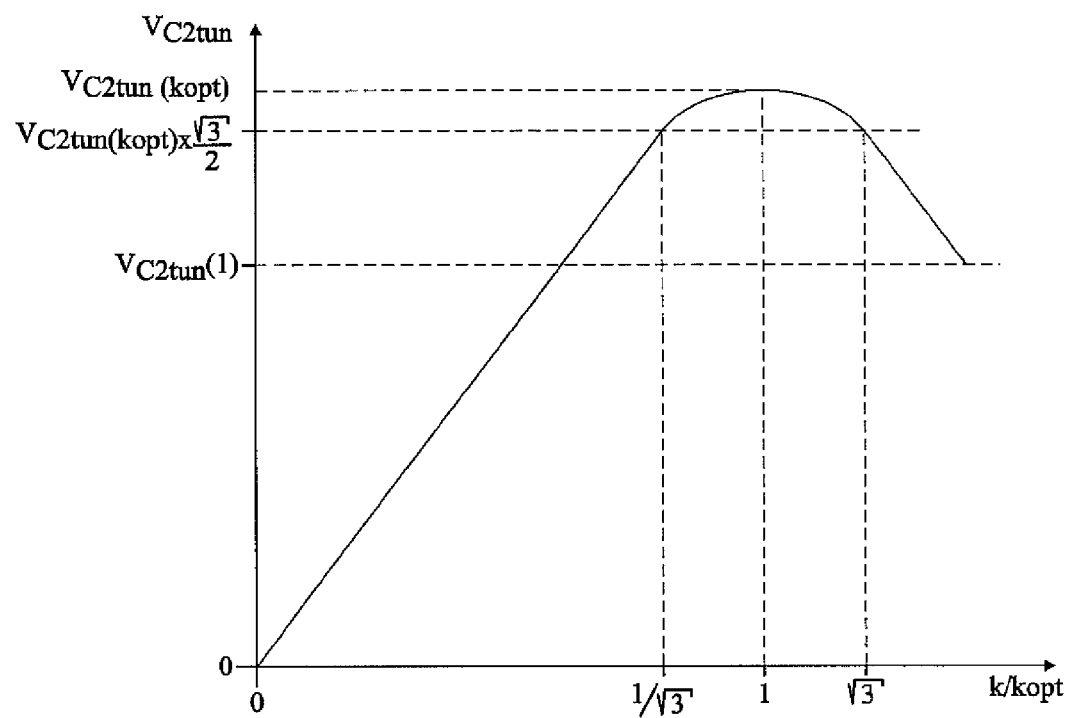
FIG. 3 illustrates an example of the shape of the voltage across the oscillating circuit of the transponder according to the coupling factor.

FIG. 3 shows an example of the shape, for a tuned transponder, of voltage $V_{C2tun}$ recovered on the transponder side according to coupling $k/k_{opt}$ normalized with respect to the optimum coupling. The curve starts from the origin of ordinates (zero voltage) for a zero coupling. This corresponds to a distance of the transponder to the terminal such that no signal can be sensed by the transponder. Voltage $V_{C2tun}$ reaches a maximum value $V_{C2tun(kopt)}$ for optimum coupling coefficient $k_{opt}$ ($k/k_{opt}=1$), and then decreases to an intermediary value $V_{C2tun}(1)$ reached at coupling k=1.

As illustrated in FIG. 3, voltage $V_{C2tun}$ crosses two points of inflexion for coupling values corresponding to ratios $k/k_{opt}=1/\sqrt{3}$ and $k/k_{opt}=\sqrt{3}$, for which voltage $V_{C2tun}$ takes value $$V_{C2tun(kopt)} \cdot \frac{\sqrt{3}}{2}.$$

To evaluate, on the transponder side, the coupling of this transponder with the terminal, the information of voltage $V_{C2}$ across capacitive element C2 of its oscillating circuit is exploited. This voltage is provided by the following relation:

$$V_{C2} = \frac{I2}{\omega \cdot C_2}, \quad \text{(Formula 3)}$$

where I2 represents the current in the oscillating circuit of the transponder, and where ω represents the pulse of the signal.

Current I2 is equal to:

$$I2 = \frac{M \cdot \omega \cdot I1}{Z2}, \quad \text{(Formula 4)}$$

where I1 represents the current in the oscillating circuit of the terminal and where Z2 represents the transponder impedance.

Impedance Z2 of the transponder is provided by the following relation:

$$Z2^2 = X2^2 + \left(\frac{L2}{R2 \cdot C2}\right)^2, \quad \text{(Formula 5)}$$

where X2 represents the imaginary part of the impedance of the oscillating circuit:

$$X2 = \omega \cdot L2 - \frac{1}{\omega \cdot C2}. \quad \text{(Formula 6)}$$

Further, current I1 in the oscillating circuit of the terminal is given by the following relation:

$$I1 = \frac{Vg}{Z1_{app}}, \quad \text{(Formula 7)}$$

where Vg designates a so-called generator voltage, exciting the oscillating circuit of the terminal, and where $Z1_{app}$ represents the apparent impedance of the oscillating circuit.

The fact of regulating the phase of the oscillating circuit of the terminal enables for all the variations which would tend to modify, statically with respect to the modulation frequencies, the imaginary part of the load formed by the transponder, to be compensated by the phase regulation loop. It is thus ensured that in static operation, the imaginary part of impedance $Z1_{app}$ is zero. Accordingly, impedance $Z1_{app}$ becomes equal to apparent resistance $R1_{app}$ (real part of the impedance) and may be expressed as:

$$Z1_{app} = R1_{app} = R1 + \frac{k^2 \cdot \omega^2 \cdot L1 \cdot L2^2}{Z2^2 \cdot R2 \cdot C2}. \quad \text{(Formula 8)}$$

When the oscillating circuits are tuned, it can be considered that imaginary part X2 of impedance Z2 is, as a first approximation, close to zero. As a result, the value of impedance Z2 comes down to its real part:

$$Z2 = \frac{L2}{R2 \cdot C2}. \quad \text{(Formula 9)}$$

By inserting this simplification into formulas 4 and 8, and inserting formula 4 into formula 3, the following formula can be obtained for voltage $V_{C2}$ recovered across the oscillating circuit of the transponder, noted $V_{C2tun}$ when the latter is tuned:

$$V_{C2tun} = k \cdot \sqrt{\frac{L1}{L2}} \cdot \frac{V_g}{\frac{R1}{R2} + k^2 \cdot \frac{L1}{L2}}. \quad \text{(Formula 10)}$$

In optimum coupling position $k_{opt}$, maximum voltage $V_{C2tun(kopt)}$ is thus provided by the following formula (combining formulas 2 and 10):

$$V_{C2tun(kopt)} = \frac{V_g}{2} \cdot \sqrt{\frac{R2}{R1}}. \quad \text{(Formula 11)}$$

It should be noted that formula 11 can only apply when the oscillating circuit of transponder L2-C2 is considered to be set to the tuning frequency, that is, $\omega \cdot \sqrt{L2 \cdot C2} = 1$.

By combining formulas 10 and 11 and expressing the coupling as normalized by the optimum coupling ($k/k_{opt}$), the following expression of voltage $V_{C2tun}$ is obtained:

$$V_{C2tun} = \frac{2 \cdot V_{C2tun(kopt)}}{\frac{k}{k_{opt}} + \frac{k_{opt}}{k}}. \quad \text{(Formula 12)}$$

Still considering that the phase is regulated on the terminal side and that the imaginary part of impedance $Z1_{app}$ is zero, it may be attempted to determine the coupling position at which voltage $V_{C2}$ across the oscillating circuit of the transponder is maximum, when its oscillating circuit is detuned, that is, with a non-zero X2 (formula 6).

To achieve this, the condition in which current I2 is maximum, can be expressed by combining formulas 4, 7, and 8. This maximum is reached when:

$$M \cdot \omega = Z2_{det} \cdot \sqrt{\frac{R1 \cdot R2}{L2 \cdot C2}}, \quad \text{(Formula 13)}$$

where $Z2_{det}$ designates the impedance of the transponder when it is detuned.

Considering that the detuning only results from a variation of capacitance C2 (antenna L2 is not modified) and noting dC2 the amplitude (positive or negative) of the detuning with respect to the value at the tuning, noted $C2_{tun}$ ($C2det=C2_{tun}+dC2$, where $C2det$ represents the detuned value of capacitance C2), impedance $Z2_{det}$ can be expressed as follows by exploiting formula 6 (formula 14):

$$Z2_{det} = \frac{L2}{R2 \cdot C2_{tun}} \cdot \sqrt{1 + \left(\omega \cdot R2 \cdot dC2 \cdot \frac{C2_{tun}}{C2det}\right)^2}.$$

By combining formulas 1, 2, 13, and 14, the value of the optimal coupling when the transponder capacitance is detuned, noted $k_{opt(det)}$, can be expressed as follows (formula 15):

$$k_{opt(det)} = k_{opt} \cdot \sqrt{1 + \left(\omega \cdot R2 \cdot dC2 \cdot \frac{C2_{tun}}{C2_{det}}\right)^2}.$$

Above formula 15 shows that for a same charge level R2, the recovered voltage $V_{C2det}$ is maximum for a higher coupling value than when transponder 2 is tuned, that is, for a position more distant from terminal 1. As compared with voltage $V_{C2tun(kopt)}$ at the optimum coupling and at the tuning, voltage $V_{C2det}$ can be expressed as follows, according to formulas 12 and 15:

$$V_{C2det} = \frac{2 \cdot V_{C2tun(kopt)}}{\frac{k}{k_{opt(det)}} + \frac{k_{opt(det)}}{k}}. \quad \text{(Formula 16)}$$

For a given coupling value k, and considering that load R2 of the transponder does not vary, a result of formula 11 is that the maximum level of 1 voltage $V_{C2det}$, $V_{C2det(kopt)}$, is the same as at the tuning, that is:

$$V_{C2det(kopt)} = V_{C2tun(kopt)}. \quad \text{(Formula 17)}$$

Further, the ratio, noted "r", between values $V_{C2det}$ at the detuning and $V_{C2tun}$ at the tuning of voltage $V_{C2}$ provides the following relation:

$$r = \frac{V_{C2det}}{V_{C2tun}} = \frac{\frac{k}{k_{opt}} + \frac{k_{opt}}{k}}{\frac{k}{k_{opt(det)}} + \frac{k_{opt(det)}}{k}}, \quad \text{(Formula 18)}$$

Above formula 18 results in that by increasing the value of detuning dC2 from tuning value $C2_{tun}$, voltage $V_{C2det}$ will be smaller or greater than voltage $V_{C2tun}$ according to the position of current coupling k.

It is provided to take advantage of this characteristic to evaluate the position of coupling k with respect to its optimum value $k_{opt}$ at the tuning. When $k=k_{opt}$, value $r_{opt}$ of ratio r becomes (formula 19):

$$r_{opt} = \cfrac{2}{\cfrac{1}{\sqrt{1+\left(\omega \cdot R2 \cdot dC2 \cdot \cfrac{C2_{tun}}{C2_{det}}\right)^2}} + \sqrt{1+\left(\omega \cdot R2 \cdot dC2 \cdot \cfrac{C2_{tun}}{C2_{det}}\right)^2}}$$

It is provided to use these relations to determine, from a ratio "r" between values $V_{C2det}$ and $V_{C2tun}$ of voltage $V_{C2}$, respectively with a detuned and a tuned transponder, the transponder position with respect to the optimum coupling at tuning $k_{opt}$.

If $$\frac{V_{C2det}}{V_{C2tun}} < r_{opt}, \quad \text{(formula 20)}$$

then current coupling k is lower than the optimum coupling at the tuning, $k_{opt}$.

Conversely, if $$\frac{V_{C2det}}{V_{C2tun}} > r_{opt}, \quad \text{(formula 21)}$$

current coupling k is greater than optimum coupling $k_{opt}$.

If the two values are equal, this means that the optimum coupling point has been reached.

In practice, the smoothed voltage $V_{Ca}$ across the capacitor at the output of rectifying bridge 23 is measured, rather than directly measuring the voltage across the oscillating circuit. Voltage $V_{Ca}$ is proportional to voltage $V_{C2}$. Since voltage ratios are evaluated, it is not necessary to know the proportionality factor between voltages $V_{C2}$ and $V_{Ca}$. In a specific embodiment, the measurement is performed by the microprocessor. The storage of the values of the measured voltages is performed either by analog means or, preferably, digitally over several bits, the number of which depends on the desired accuracy of analysis.

The estimation of the position of current coupling k with respect to its optimum value may be refined by estimating the position with respect to the points of inflexion of the curve of FIG. 3. Indeed, for coupling positions where ratio $k/k_{opt}=1/\sqrt{3}$ and $k/k_{opt}=\sqrt{3}$, formula 18 enables to write the following respective ratios r1 (formula 21) and r2 (formula 23):

$$r1 = \cfrac{\cfrac{1}{\sqrt{3}} + \sqrt{3}}{\cfrac{1}{\sqrt{3 \cdot \left(1+\left(\omega \cdot R2 \cdot dC2 \cfrac{C2_{tun}}{C2_{det}}\right)^2\right)}} + \sqrt{3 \cdot \left(1+\left(\omega \cdot R2 \cdot dC2 \cfrac{C2_{tun}}{C2_{det}}\right)^2\right)}},$$

$$r2 = \cfrac{\cfrac{1}{\sqrt{3}} + \sqrt{3}}{\sqrt{\cfrac{3}{1+\left(\omega \cdot R2 \cdot dC2 \cdot \cfrac{C2_{tun}}{C2_{det}}\right)^2}} + \sqrt{\cfrac{1+\left(\omega \cdot R2 \cdot dC2 \cdot \cfrac{C2_{tun}}{C2_{det}}\right)^2}{3}}}.$$

Figure 4:
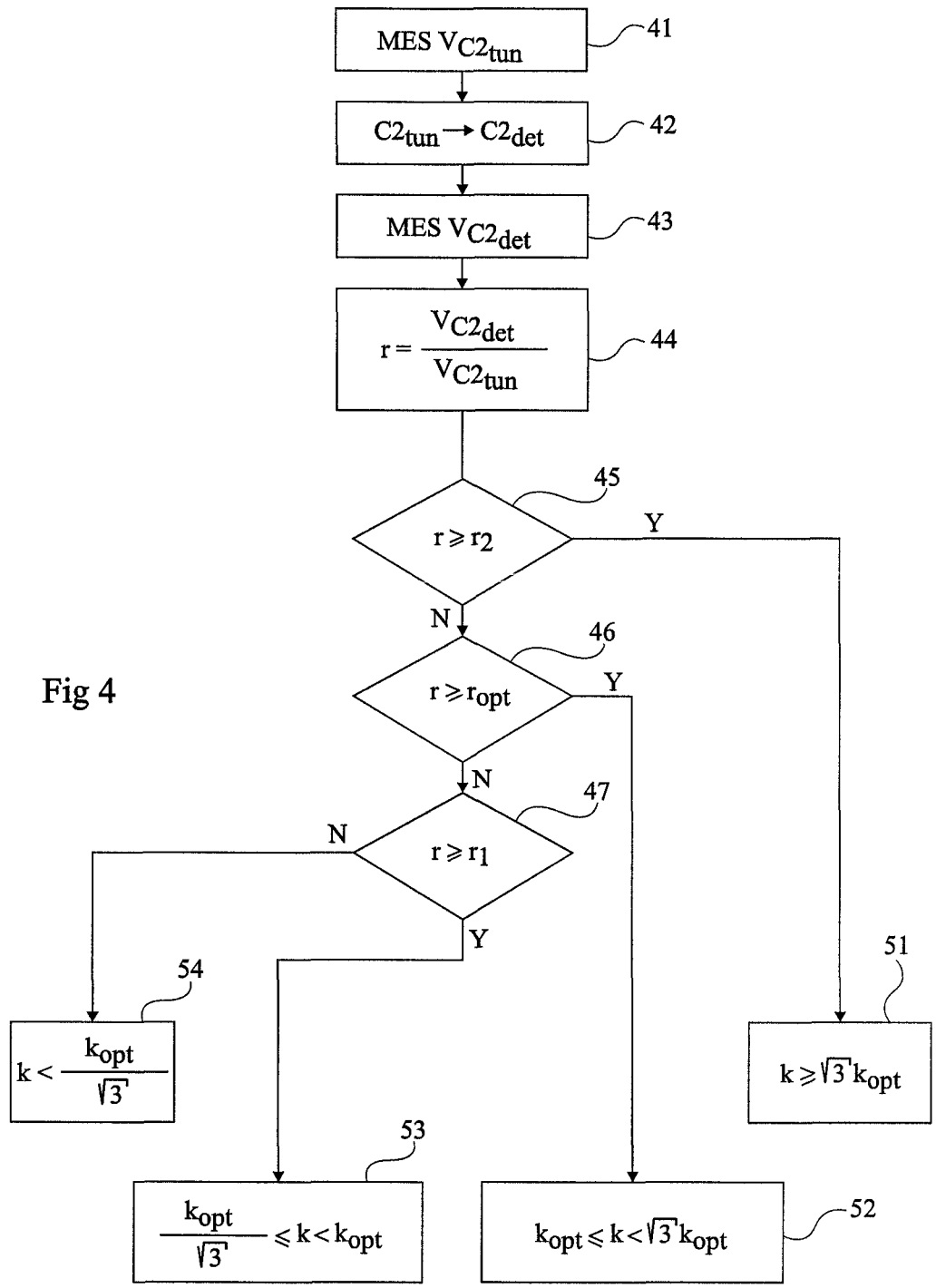
FIG. 4 is a functional block diagram illustrating an implementation mode of the coupling factor evaluation method.

FIG. 4 illustrates the implementation of such an embodiment. To simplify the discussion of FIG. 4, it is still referred to values $V_{C2tun}$ and $V_{C2det}$, knowing that it is in practice easier to measure values $V_{Catun}$ and $V_{Cadet}$ of voltage $V_{Ca}$ but that this changes nothing to the comparison thresholds of ratio r.

It is started (block 41, MES $V_{C2tun}$) by measuring and storing the voltage across capacitor C2 with a first value $C2_{tun}$ of capacitance C2. Then (block 42, $C2_{tun} \rightarrow C2_{det}$), the value of the capacitive element is increased up to a greater value ($C2_{tun}+dC2$).

Then (block 43, $V_{C2det}$) voltage $V_{C2det}$ is measured with capacitance value $C2_{det}$, which is stored.

Then, ratio r between the measured values is calculated and measured (block 44, $$\left(\text{block } 44, \, r = \frac{V_{C2det}}{V_{C2tun}}\right)$$

to be compared with the different thresholds enabling to determine the position of the coupling with respect to the optimum coupling and to the characteristic points where $k/k_{opt}=1/\sqrt{3}$ and $k/k_{opt}=\sqrt{3}$. As a variation, ratio r is calculated for each subsequent comparison.

For example, it is started by comparing (block 45, r≥r2) ratio r with respect to a threshold corresponding to point $k/k_{opt}=\sqrt{3}$. If r is greater than or equal to this threshold (output Y of block 45), processing circuit 27 provides the information (block 51, k≥$\sqrt{3} \cdot k_{opt}$) that the current coupling is greater than or equal to optimum coupling $k_{opt}$ at the tuning, multiplied by $\sqrt{3}$.

If r is lower than the first threshold (output N of block 45), it is tested (block 46, r≥$r_{opt}$) whether it is greater than or equal to optimum coupling $k_{opt}$. If it is (output Y of block 46), the current coupling is comprised between the optimum coupling at the tuning and its product by $\sqrt{3}$ (block 52, $k_{opt} \leq k < \sqrt{3} \cdot k_{opt}$).

If not (output N of block 46), it is tested (block 47, r≥r1) whether r is greater than or equal to a third threshold corresponding to point $k/k_{opt}=1/\sqrt{3}$. If it is (output Y of block 47), the current coupling ranges between the optimum coupling at the tuning and the quotient of the optimum coupling by $\sqrt{3}$ (block 53, $$\left(\text{block } 53, \, \frac{k_{opt}}{\sqrt{3}} \leq k < k_{opt}\right).$$

If not (output N of block 47), the current coupling is lower than the optimum coupling at the tuning divided by $\sqrt{3}$ (block 54, $$\left(\text{block 54}, < \frac{k_{opt}}{\sqrt{3}}\right).$$

Once the measurements have been performed with value $C2_{det}$, it is returned to value $C2_{tun}$, considered as nominal. This return to the nominal value preferably occurs as soon as the measurement has been performed (before step 44). It may however be provided for it to intervene later on in the process, for example, at the end of the evaluation.

It is thus possible, by two voltage measurements with two capacitance values of the oscillating circuit of the transponder, to have it determine the current coupling with the terminal with respect to an optimum coupling at the tuning.

The evaluation may also be performed by decreasing the value of capacitance C2 with respect to value $C2_{tun}$. Be it by increasing or by decreasing capacitance C2, it will be ascertained for the value to remain sufficient to preserve a sufficient value $V_{C2det}$ of voltage $V_{C2}$ to provide a power supply of the transponder circuits.

Figure 5:
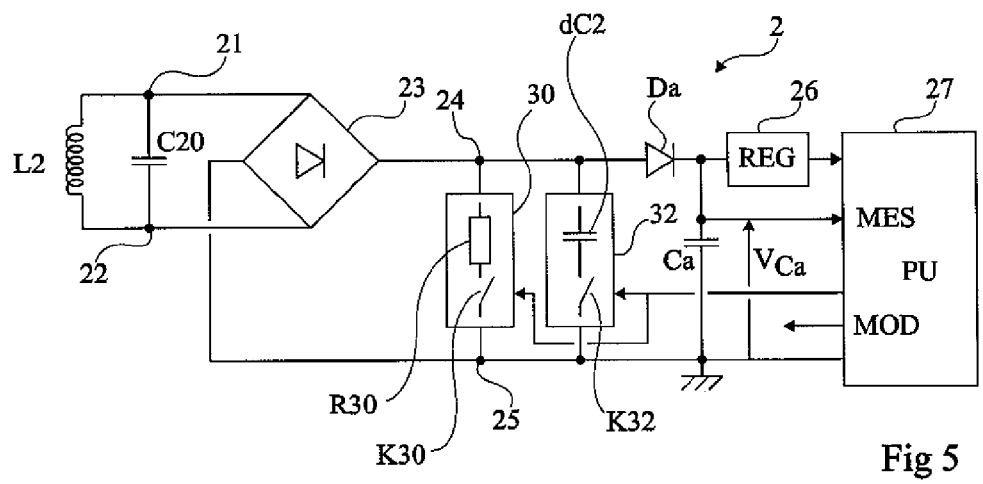
FIG. 5 is a block diagram of an embodiment of a transponder adapted to evaluating its coupling factor with respect to a terminal.

FIG. 5 is a block diagram of an embodiment of a transponder 2, equipped to automatically determine, when it is in the field of a terminal (not shown), the current coupling with respect to the optimum coupling. The representation of FIG. 5 is simplified with respect to that of FIG. 2. In particular, the elements of demodulation and for obtaining the clock frequency have not been illustrated.

As previously, transponder 2 is based on a parallel oscillating circuit. In the example of FIG. 5, it is assumed that an inductive element L2 and a capacitive element C20 are present upstream of diode bridge 23 with respect to processing system 27. A switchable capacitive element 32 is provided between terminals 24 and 25 of rectifying bridge 23. This element 32, for example, comprises a capacitive element of value dC2 in series with a switch K32, and is adapted to be switched to implement the method for determining the coupling position. It is not a retromodulation element which, in the example of FIG. 5, is resistive (circuit 30). To avoid any influence of capacitor Ca, said capacitor is placed downstream of block 32, and a diode Da is interposed on the positive line between this block and the connection of capacitor Ca. As a variation, the diode may be placed on the reference line, provided to accept a voltage drop between the reference of block 32 and those of the other circuits on the side of unit 27. Processing unit 27 (PU) receive information relative to voltage $V_{Ca}$ on an input MES to implement the above-described method.

Figure 6:
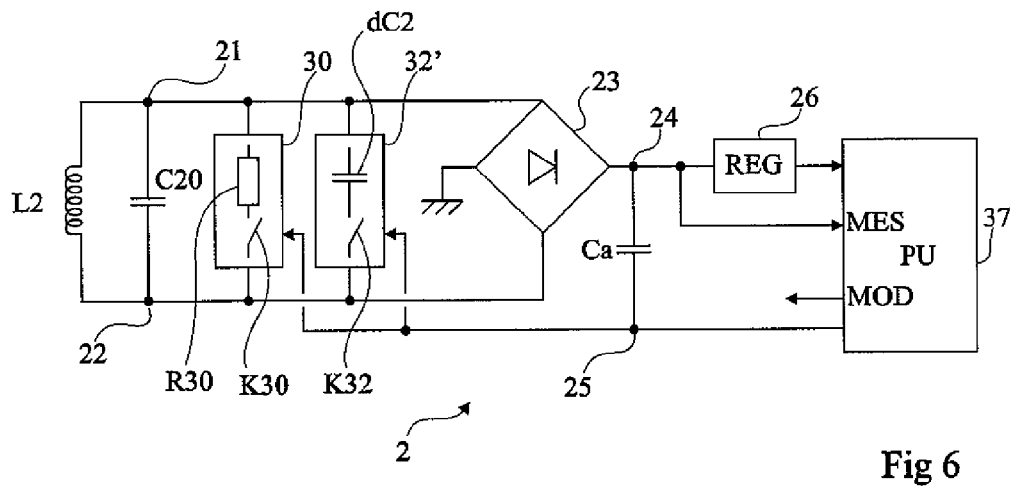
FIG. 6 is a block diagram of another embodiment of a transponder capable of evaluating its coupling factor with respect to a terminal.

FIG. 6 is a block diagram of another embodiment of a transponder. As compared with the embodiment of FIG. 5, switchable capacitive element 32' is connected upstream of bridge 23, that is, directly in parallel on elements L2 and C20. In the example of FIG. 6, resistive retromodulation circuit 30 is also illustrated upstream of the rectifying bridge. This is however not indispensable.

Figure 7:
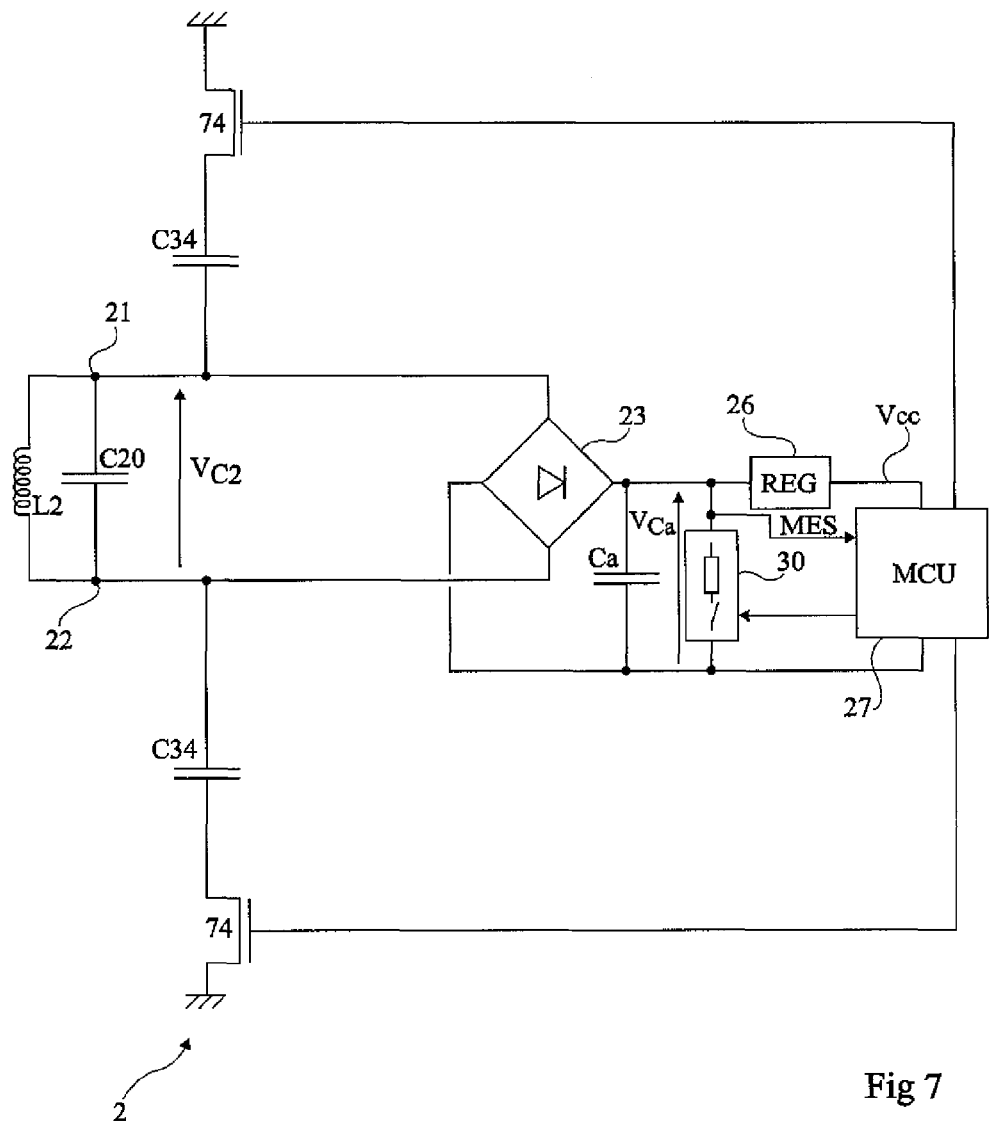
FIG. 7 is a block diagram of still another embodiment of a transponder capable of evaluating its coupling factor with respect to a terminal.

FIG. 7 shows an example of a more detailed diagram of a transponder 2 equipped to evaluate the coupling factor when it is in the field of a terminal. This embodiment corresponds to FIG. 6, that is, with the switchable capacitive element upstream of rectifying bridge 23. To ease the control from the processing unit (MCU) 27, a capacitive element C34 is provided between each terminal 21 and 22 of the oscillating circuit and the ground. Each capacitive element C34 is in series with a switch 74. Switches 74 (for example, MOS transistors) are controlled by central processing unit 27. In FIG. 7, a retromodulation stage 30 (for example, resistive) has been illustrated downstream of bridge 23.

The fact of knowing of the current coupling coefficient with respect to the optimum coupling may have several applications.

For example, this information may be used to detect a risk of transponder overheating. Indeed, when the coupling is close to the optimum coupling, the power recovered by the transponder is maximum. For example, it will be possible to only switch switches 74 (FIG. 7) or blocks 32 (FIG. 5) or 32' (FIG. 6), by providing separate control links.

According to another example of application, knowing the position of the coupling with respect to the optimum coupling enables optimizing the power management in the communication with a terminal. The functions executed by the processing unit of the transponder can thus be selected according to the available power.

The coupling may be evaluated periodically during a communication. The only precaution to be taken is not to evaluate the coupling during a retromodulation of the transponder. A first evaluation is, for example, performed as soon as the power recovered by the transponder is sufficient for microprocessor 27 to operate. Then, periodic measurements are performed during the communication.

According to still another example, the position of the current coupling with respect to the optimum coupling is transmitted to the terminal so that it adapts the communication (the requests that it sends to the transponder) to the power available for the transponder, which conditions its computing capacity.

It should be noted that the coupling is determined without it being necessary to establish a communication with the terminal.

Further, the value of the optimum coupling varies from one terminal to another. Evaluating the current coupling with respect to the optimum coupling as described hereabove enables to ignore the characteristics of a given terminal and makes the evaluation independent from the terminal. Thus, a transponder equipped with means for evaluating the coupling of the present invention can operate with any existing terminal.

Various embodiments with different variations have been described hereabove. It should be noted that those skilled in the art may combine various elements of these various embodiments and variations without showing any inventive step. In particular, the calculations with formulas may be replaced with comparisons/selections of values stored in tables of the microcontroller. Moreover, the selection of the values to be given to the capacitive elements is within the abilities of those skilled in the art based on the functional indications given hereabove and on the system to which the transponder is adapted.

Of course, the present invention is likely to have various alterations, modifications, and improvements which will readily occur to those skilled in the art. Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for evaluating a current coupling factor between an electromagnetic transponder and a terminal, comprising acts of:
obtaining, by the electromagnetic transponder, a ratio between data representative of a voltage across an oscillating circuit of the transponder for two capacitance values of the oscillating circuit; and comparing, by the electromagnetic transponder, the ratio with at least one threshold to provide a result indicative of the current coupling factor, wherein the at least one threshold is selected based on one or both of the two capacitance values.

2. The method of claim 1, wherein obtaining a ratio comprises:
measuring and storing first data, relative to a level of a D.C. voltage provided by a rectifier across the oscillating circuit for a first value of the capacitance; and
measuring and storing second data, relative to the level of said D.C. voltage for a second value of the capacitance.

3. The method of claim 1, wherein the evaluation provides a position of the current coupling factor with respect to a position of optimum coupling with one of the two values of the capacitance.

4. The method of claim 1, wherein the at least one threshold is a function of both of said capacitance values.

5. The method of claim 1, wherein a variation of the capacitance between the first and second values is obtained by switching a capacitive element comprised by the transponder.

6. The method of claim 1, wherein the at least one threshold is selected based on a ratio between the two capacitance values.

7. The method of claim 6, wherein the two capacitance values comprise a first capacitance value associated with a tuned state of the transponder and a second capacitance value associated with a detuned state of the transponder.

8. The method of claim 1, wherein the at least one threshold is selected further based on a resistive load on the oscillating circuit.

9. The method of claim 1, wherein the at least one threshold is selected such that:
the ratio being below the at least one threshold indicates that the current coupling factor is below an optimum coupling factor; and
the ratio being above the at least one threshold indicates that the current coupling factor is above an optimum coupling factor.

10. An electromagnetic transponder comprising:
an oscillating circuit upstream of a rectifying circuit capable of providing a D.C. voltage when the transponder is in the magnetic field of a terminal; and
at least one processing unit programmed to implement the method of claim 1.

11. The transponder of claim 10, further comprising at least one switchable capacitive element capable of being functionally connected in parallel to the oscillating circuit.

12. A method for evaluating a current coupling factor between a terminal and an electromagnetic transponder having an oscillating circuit, comprising acts of:
measuring, by the transponder, a first value representative of a voltage across the oscillating circuit with a first capacitance value associated with the oscillating circuit;
measuring, by the transponder, a second value representative of the voltage across the oscillating circuit with a second capacitance value associated with the oscillating circuit;
determining, by the transponder, a ratio of the first value to the second value; and
comparing, by the transponder, the ratio to at least one threshold, wherein a result of the comparing is indicative of the current coupling factor, and wherein the at least one threshold is selected based on one or both of the two capacitance values.

13. A method for evaluating a current coupling factor as defined in claim 12, further comprising switching, after measuring the first value, from the first capacitance value to the second capacitance value.

14. A method for evaluating a current coupling factor as defined in claim 13, wherein switching comprises switching a capacitive element coupled to an output of a rectifier having an input coupled to the oscillating circuit.

15. A method for evaluating a current coupling factor as defined in claim 13, wherein switching comprises switching a capacitive element coupled to the oscillating circuit.

16. A method for evaluating a current coupling factor as defined in claim 13, wherein switching comprises switching capacitive elements coupled between respective terminals of the oscillating circuit and a reference voltage.

17. A method for evaluating a current coupling factor as defined in claim 12, wherein measuring a first value and measuring a second value each comprise measuring a voltage at an output of a rectifier having an input coupled to the oscillating circuit.

18. A method for evaluating a current coupling factor as defined in claim 12, wherein comparing the ratio to the at least one threshold comprises comparing the ratio to a first threshold and, if the ratio is greater than the first threshold, determining that the current coupling factor is greater than the square root of three times the optimum coupling factor.

19. A method for evaluating a current coupling factor as defined in claim 18, wherein comparing the ratio to the at least one threshold further comprises, if the ratio is not greater than the first threshold, comparing the ratio to a second threshold and, if the ratio is greater than the second threshold, determining that the current coupling factor is between the optimum coupling factor and the square root of three times the optimum coupling factor.

20. A method for evaluating a current coupling factor as defined in claim 19, wherein comparing the ratio to the at least one threshold further comprises, if the ratio is not greater than the second threshold, comparing the ratio to a third threshold and, if the ratio is greater than the third threshold, determining that the current coupling factor is between the optimum coupling factor divided by the square root of three and the optimum coupling factor and, if the ratio is not greater than the third threshold, determining that the current coupling factor is less than the optimum coupling factor divided by the square root of three.

21. The method of claim 12, wherein the at least one threshold is selected based on a ratio between the two capacitance values.

22. The method of claim 21, wherein the two capacitance values comprise a first capacitance value associated with a tuned state of the transponder and a second capacitance value associated with a detuned state of the transponder.

23. The method of claim 12, wherein the at least one threshold is selected further based on a resistive load on the oscillating circuit.

24. The method of claim 12, wherein the at least one threshold is selected such that:
the ratio being below the at least one threshold indicates that the current coupling factor is below an optimum coupling factor; and
the ratio being above the at least one threshold indicates that the current coupling factor is above an optimum coupling factor.

25. An electromagnetic transponder comprising:

an oscillating circuit; and a processing circuit configured to evaluate a current coupling factor between a terminal and the electromagnetic transponder, wherein the processing circuit is configured to:

measure a first value representative of a voltage across the oscillating circuit with a first capacitance value associated with the oscillating circuit;

measure a second value representative of the voltage across the oscillating circuit with a second capacitance value associated with the oscillating circuit;

determine a ratio of the first value to the second value; and compare the ratio to at least one threshold, wherein a result of the comparison is indicative of the current coupling factor, and wherein the at least one threshold is selected based on one or both of the two capacitance values.

26. An electromagnetic transponder as defined in claim 25, wherein the processing circuit is further configured to switch from the first capacitance value to the second capacitance value after measuring the first value.

27. An electromagnetic transponder as defined in claim 26, further comprising a rectifier having an input coupled to the oscillating circuit, wherein the processing circuit is configured to switch a capacitive element coupled to an output of the rectifier.

28. An electromagnetic transponder as defined in claim 26, wherein the processing circuit is configured to switch a capacitive element coupled to the oscillating circuit.

29. An electromagnetic transponder as defined in claim 26, wherein the processing circuit is configured to switch capacitive elements coupled between respective terminals of the oscillating circuit and a reference voltage.

30. An electromagnetic transponder as defined in claim 25, further comprising a rectifier having an input coupled to the oscillating circuit, wherein the processing circuit is configured to measure the first value and the second value by measuring a voltage at an output of the rectifier.

31. An electromagnetic transponder as defined in claim 25, wherein the processing circuit is configured to compare the ratio to a first threshold and, if the ratio is greater than the first threshold, to determine that the current coupling factor is greater than the square root of three times the optimum coupling factor.

32. An electromagnetic transponder as defined in claim 31, wherein the processing circuit is configured, if the ratio is not greater than the first threshold, to compare the ratio to a second threshold and, if the ratio is greater than the second threshold, to determine that the current coupling factor is between the optimum coupling factor and the square root of three times the optimum coupling factor.

33. An electromagnetic transponder as defined in claim 32, wherein the processing circuit is configured, if the ratio is not greater than the second threshold, to compare the ratio to a third threshold and, if the ratio is greater than the third threshold, to determine that the current coupling factor is between the optimum coupling factor divided by the square root of three and the optimum coupling factor and, if the ratio is not greater than the third threshold, to determine that the current coupling factor is less than the optimum coupling factor divided by the square root of three.

34. An electromagnetic transponder as defined in claim 25, wherein the at least one threshold is selected based on a ratio between the two capacitance values.

35. An electromagnetic transponder as defined in claim 34, wherein the two capacitance values comprise a first capacitance value associated with a tuned state of the transponder and a second capacitance value associated with a detuned state of the transponder.

36. An electromagnetic transponder as defined in claim 25, wherein the at least one threshold is selected further based on a resistive load on the oscillating circuit.

37. An electromagnetic transponder as defined in claim 25, wherein the at least one threshold is selected such that:

the ratio being below the at least one threshold indicates that the current coupling factor is below an optimum coupling factor; and the ratio being above the at least one threshold indicates that the current coupling factor is above an optimum coupling factor.

* * * * *

UNITED STATES PATENT AND TRADEMARK OFFICE
CERTIFICATE OF CORRECTION

| | | |
|---|---|---|
| PATENT NO. | : 8,798,533 B2 | Page 1 of 1 |
| APPLICATION NO. | : 13/151622 | |
| DATED | : August 5, 2014 | |
| INVENTOR(S) | : Luc Wuidart | |

It is certified that error appears in the above-identified patent and that said Letters Patent is hereby corrected as shown below:

In the Specification:

In Column 8, Line 44, the number "1" should be deleted.

Signed and Sealed this
Twenty-first Day of October, 2014

Michelle K. Lee
*Deputy Director of the United States Patent and Trademark Office*